April 2, 1946.　　　　W. S. KALS　　　　2,397,742
AUTOMATIC OPERATION OF DIAPHRAGMS AND SHUTTERS OF PORTRAIT CAMERAS
Filed May 31, 1944　　　2 Sheets-Sheet 1
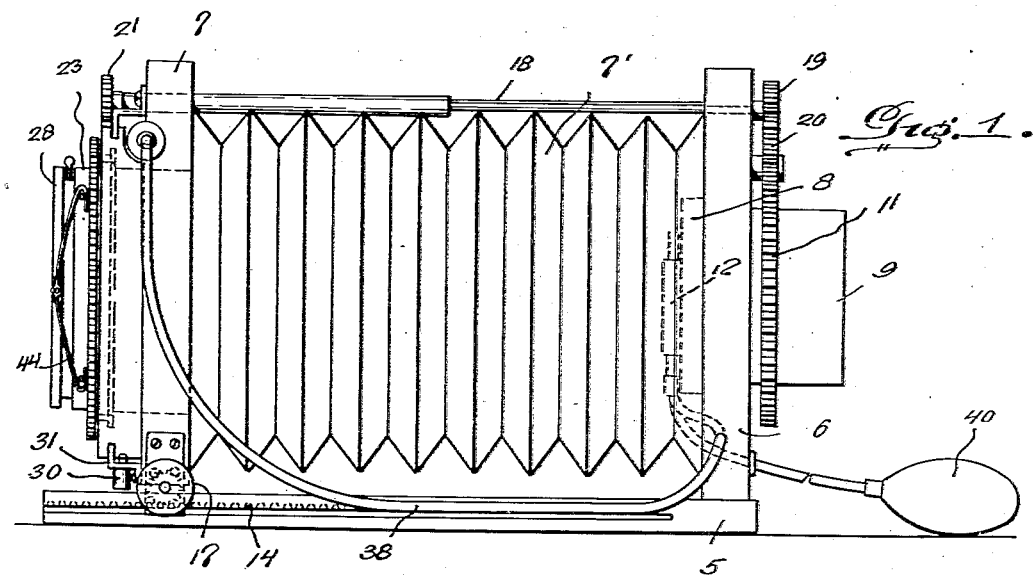
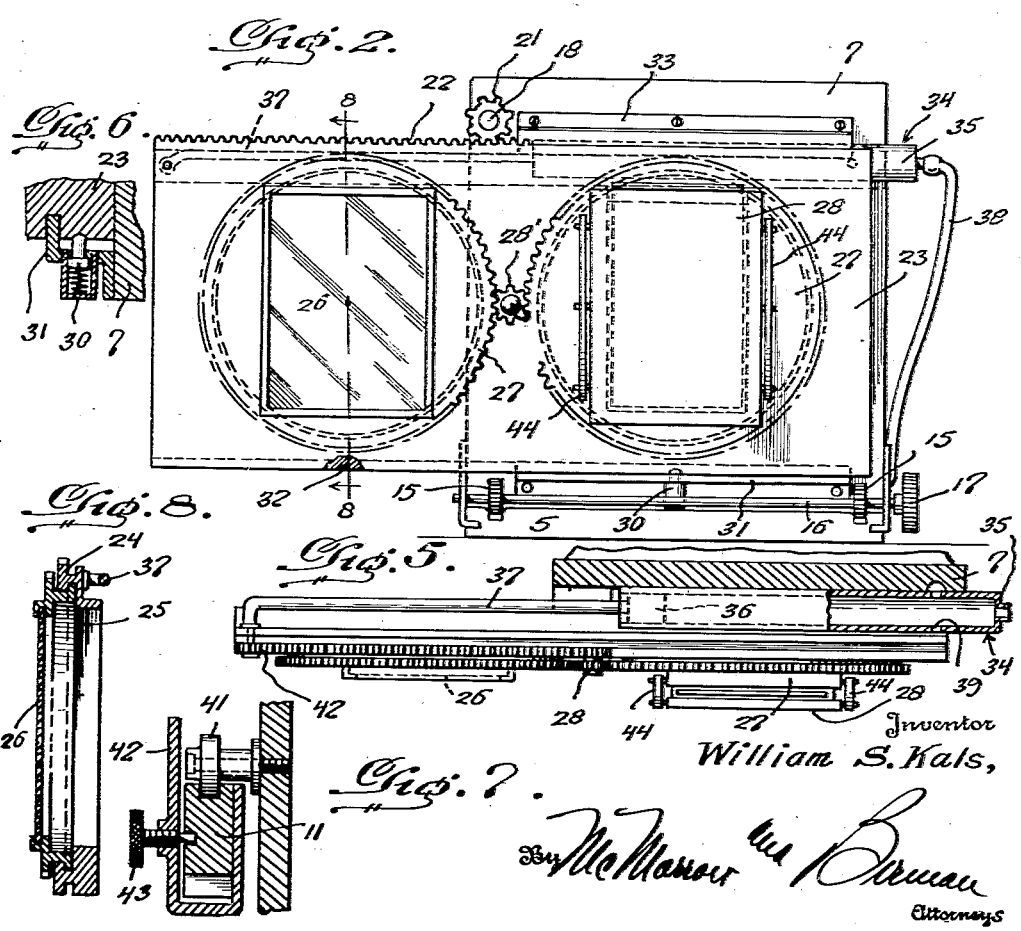
Inventor
William S. Kals, Inventor
William S. Kals, Patented Apr. 2, 1946

2,397,742

UNITED STATES PATENT OFFICE 2,397,742

AUTOMATIC OPERATION OF DIAPHRAGMS AND SHUTTERS OF PORTRAIT CAMERAS

William S. Kals, Vancouver, British Columbia, Canada, assignor to Graflex, Inc., Rochester, N. Y., a corporation of Delaware Application May 31, 1944, Serial No. 538,133

17 Claims. (Cl. 95—39)

This invention relates to cameras of the type used for taking portraits and which requires a number of independent manual operations in the taking of each picture, as for instance, the focussing of the camera on the subject, requiring the position of the groundglass in place for focussing and the opening of the iris type diaphragm and the opening of the shutter and then the closing down of the diaphragm and the closing of the shutter after completing the focussing operation and then the bringing of the sensitized plate or the film pack into position for picture taking position.

It is the primary object of this invention to provide a camera of the character stated wherein the number of independent manual operations will be reduced to a minimum and which permits portraits to be taken in much less time and with less chance of plate or film spoiling.

Another object of this invention is the provision of a movable carrier for the groundglass and the sensitized plate or film pack holder which may be easily slid relative to the camera body or box to either bring the groundglass into focussing position or the sensitized plate or film pack into picture taking position and includes means for opening and closing the shutter as the groundglass is moved into and out of focussing position and means for opening and closing down of the iris of the diaphragm at the same time, thereby eliminating a number of independent operations heretofore necessary in operation with cameras of this character.

A further object of this invention is the provision of means whereby the groundglass and the sensitized plate or film pack holder may be simultaneously adjusted for taking portraits, so that the longest distance of the portrait may be taken either vertical or horizontal.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a side elevation illustrating a portrait type camera equipped with means for the automatic operation of the diaphragm and shutter.

Figure 2 is a rear elevation illustrating the camera.

Figure 5 is a fragmentary top plan view partly in section showing the shutter operating pump and its connection with the carrier for the groundglass and the sensitized plate or film pack holder.

Figure 6 is a detail sectional view illustrating a spring detent for releasably securing the carrier in either of its positions.

Figure 7 is a detail sectional view illustrating a mounting for the operating gear of the iris of the diaphragm.

Figure 8 is a sectional view taken on the line 8—8 of Figure 2.

Figure 3:
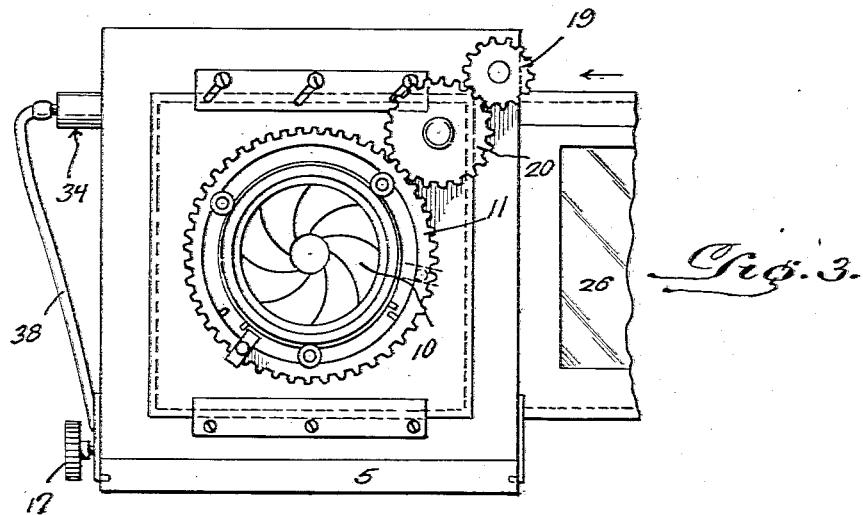
Figure 3 is a front elevation illustrating the camera.
Figure 4:
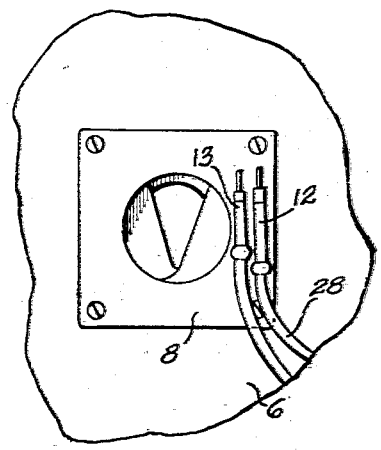
Figure 4 is a detail view illustrating the shutter.

Referring in detail to the drawings, the base of the camera is indicated by the character 5 and has permanently mounted on one end thereof a front panel 6 and a rear panel 7 is slidably mounted on the base for adjustment toward and from the front panel. Both panels have aligned openings. The opening of the front panel 6 is controlled by a conventional type of shutter 8 and a diaphragm mechanism 9 including the usual adjustable iris 10 operated through the rotation of a gear 11 in opposite directions. The diaphragm mechanism may also include the usual lens (not shown) positioned between the iris and the shutter mechanism. The shutter mechanism includes the conventional instantaneous operating pump 12 and the time operating pump 13. This type of shutter mechanism is commercially known by the name of "Packard #8."

A bellows extension 7' connects the front and rear panels 6 and 7 to exclude light and permit the rear panel to be adjusted toward and from the front panel.

The rear panel 7 is adjusted on the base 5 through the use of a rack 14 meshing with gears 15 secured on an operating shaft 16 provided with a finger knob 17.

An operating shaft 18 for the gear 11 is journaled in the front and rear panels and includes telescopic sections. The sections of the shaft are splined together and one section has a gear 19 secured thereto. The gear 19 meshes with a gear 20 journaled on the front panel 6 and meshes with the gear 11. The other section of the shaft 18 has secured thereto a gear 21 meshing with a rack 22 forming a part of a carrier 23 slidably mounted on the rear panel 7. The carrier 23 is in the form of an elongated plate provided with a pair of openings, either of which may be brought to match or align with the opening of the rear panel. Annular guides 24 are mounted on the carrier 23 about the openings thereof and rotatably support annular holders 25, one of which supports the groundglass 26 and the other supports a plate 27 on which is removably mounted a sensitized plate or film pack holder 28. The annular members 25 have formed thereon gear teeth 27 meshing with an idler gear 28' journaled on the carrier 23 so that if the groundglass or the holder 28 is rotated the other will be rotated. This will permit the positioning of the holder 28 as well as the groundglass for taking portraits either vertically or horizontally.

A spring influenced detent 30 is mounted on the base 5 or a guide plate 31 carried thereby for the purpose of engaging in either of the notches 32 of the carrier for securing the latter in either of its positions, that is, with the holder 28 in matched relation with the opening of the rear panel or the groundglass in matched relation with the opening of the rear panel 7. The guide plate 31 engages in a groove of the carrier and a similar guide plate 33 engages in a groove of the carrier whereby the carrier may be slid freely in either direction. The sliding of the carrier as specified, brings about rotation of the operating shaft 18 for the operation of the iris which will be hereinafter more clearly described in detail.

A pump 34 is mounted on the rear panel 7 and includes a cylinder 35 provided with a piston 36, the stem of which is indicated by the character 37 and is secured to the carrier so that the sliding movement of the latter in opposite directions will bring about reciprocation of the piston in the cylinder 35.

Connected with the closed end of the cylinder 35 is a flexible tube 38 connected to the time pump 13 of the shutter mechanism. Spaced a limited distance from the closed end of the cylinder 35 are vent openings 39 to allow air pressure to exhaust from the pump 13. However, when the piston 36 moves a given distance within the cylinder 35, the piston will close the vent opening and compress air to actuate the pump 13 of the shutter mechanism. The purpose of arranging the vent openings 39 as specified is so that the piston may have a certain amount of movement in the cylinder 35 by the action of the carrier 23 bringing the groundglass toward the opening of the panel 7 before the shutter pump 13 will be operated to bring about opening of the shutter. As the groundglass nears a position of alignment with the opening of the rear panel, the shutter pump will be operated moving the shutter into open position and retaining the same in this position so that the camera through the use of the groundglass can be focussed. The said movement of the carrier to bring the groundglass into the stated position also brings about operation of the iris into fully open position.

A reverse movement of the carrier brings the film or sensitized plate holder 28 toward the opening in the panel 7. The initial movement in this direction brings about release of air pressure on the shutter pump 13 permitting the shutter to close also to start the movement of the iris in a direction of closing down the light to be admitted to the camera and as the carrier brings the sensitized plate or film holder 28 in position matched with the opening of the rear panel 7, the iris has been properly positioned for the taking of the picture or portrait and the shutter is then closed so that the operator through the actuation of the pump 12 by the bulb 40 may bring about operation of the shutter for taking the picture or permitting light to affect the sensitized plate or the film.

From the foregoing description taken in connection with the accompanying drawings it will be seen that the taking of pictures or portraits by this type of camera has been simplified by reducing the number of manual operations necessary in the actuation of the camera. The actuation of the carrier 23 to bring the groundglass or the sensitized plate or film in the desired position, automatically operates the shutter and the iris of the diaphragm, eliminating independent manipulation of the shutter and the iris of the diaphragm as has heretofore been necessary in cameras of this type.

As shown in Figure 7 the gear 11 is supported on rollers 41 and the gear has secured thereto adjustable stops 42, one of which is clearly shown in Figure 7 and secured to the gear 11 by a set screw 43. The stops 42 may be adjusted circumferentially of the gear and cooperate with stops on the operating mechanism of the iris 10 of the diaphragm.

The holder 28 for the film or sensitized plate is removably secured on the plate 27 by spring clips 44 which can be easily flexed for applying and removing the holder 28.

While I have shown and described the preferred embodiment of my invention, it will be understood that minor changes in construction, combination and arrangement of parts may be made without departing from the spirit and scope of the invention as claimed.

Having thus described one illustrative embodiment of the invention, it is to be understood that although specific terms are employed, they are used in a generic and descriptive sense and not for purposes of limitation, the scope of the invention being set forth in the following claims.

Having thus described the invention, what I claim is:

1. A photographic camera having at the front thereof a diaphragm mechanism with adjustable iris in suitable relation to the camera shutter which is open when viewing, a manually operable carrier mounted at the rear of the camera for movement transverse to the exposure area of the camera, and means operatively connecting the said iris and said carrier for opening the iris for focusing and for closing down the iris preliminary to photographic exposure by transverse movements of said carrier, said carrier having means to support a ground glass and a holder for a sensitized surface, so that either the ground glass or the sensitized surface holder may be aligned with the exposure area of the camera by transverse movement of said carrier, in accordance with the opening or the closing down of the iris by such transverse movement of said carrier.

2. A photographic camera having at the front thereof a shutter and a diaphragm mechanism with adjustable iris in suitable relation to the camera shutter, a manually operable carrier mounted at the rear of the camera for movements transverse to the exposure area of the camera, and means operatively connecting the said iris and said carrier for opening the iris for focusing and for closing down the iris preliminary to photographic exposure by transverse movements of said carrier, means operatively connecting the said shutter and said carrier for operating the shutter by transverse movements of said carrier, said carrier having means to support a ground glass and a holder for a sensitized surface, so that either the ground glass or the sensitized surface holder may be aligned with the exposure area of the camera by transverse movement of said carrier, in accordance with the opening or the closing down of the iris by such transverse movement of said carrier.

3. A photographic camera having at the front thereof an iris-type diaphragm, a shutter in suitable relation thereto and which is open when viewing, a normally operable carrier mounted at the rear of the camera for manually imparted movement transverse to the exposure area of the camera, said carrier having means to support a ground glass and to support a holder for a sensitized surface, so that either the ground glass or the sensitized surface holder may be aligned with the exposure area of the camera by said transverse movement of said carrier, and means operatively connecting in movement said iris type diaphragm and said carrier, thereby to open the iris for focusing by the act of manually positioning the carrier to bring the ground glass thereof into alignment with the exposure area of the camera, and to close down the iris, preliminary to photographic exposure, by the act of manually positioning the carrier to bring the sensitized surface thereof into alignment with the said exposure area of the camera.

4. A photographic camera having at the front thereof an iris-type diaphragm, a shutter in suitable relation thereto, a normally operable carrier mounted at the rear of the camera for manually imparted movement transverse to the exposure area of the camera, said carrier having means to support a ground glass and to support a holder for a sensitized surface, so that either the ground glass or the sensitized surface holder may be aligned with the exposure area of the camera by said transverse movement of said carrier, and means for operatively connecting in movement the said carrier with the shutter and with the iris-type diaphragm, thereby to open the shutter and to open the iris for focusing, by the act of manually positioning the carrier to bring the ground glass thereof into alignment with the exposure areas of the camera, and to close the shutter and close down the iris, preliminary to photographic exposure, by the act of manually positioning the carrier to bring the sensitized surface thereof into alignment with the said exposure area of the camera.

5. A photographic camera in accordance with claim 3, but wherein the said carrier is provided with a set of gear teeth, and there is provided a telescopic shaft having a gear meshing with said gear teeth and also having another gear, and wherein the iris-type diaphragm has a gear which is in train with the last referred to gear upon the said telescopic shaft.

6. A photographic camera in accordance with claim 4, but wherein there is provided a pump having a piston connected to the said carrier to be reciprocated thereby, and which pump is operatively connected to the shutter to operate the shutter.

7. A photographic camera in accordance with claim 4, but wherein there is provided a pump operatively connected to the carrier to be actuated thereby, the said pump having a cylinder provided with one or more vent holes and a piston connected to the carrier.

8. A photographic camera in accordance with claim 3, but wherein there is provided a telescopic shaft having on one section thereof a gear and on the other section a gear, and wherein there is provided a rack on a lateral edge of the carrier meshing with the last referred to gear.

9. A photographic camera in accordance with claim 3, but wherein the iris-type diaphragm has a gear, and wherein there is provided a pinion meshing with it, and wherein there is provided a telescopic shaft having a pinion on one end thereof meshing with the pinion that meshes with the gear of the iris-type diaphragm, and wherein the said telescopic shaft has on the other end thereof another pinion, and wherein there is provided a rack meshing with said last referred to pinion, and which rack extends along a horizontal edge of the said carrier.

10. A photographic camera in accordance with claim 3, but wherein the said carrier is mounted so as to be movable transversely across the exposure opening.

11. A photographic camera in accordance with claim 3, but wherein there is provided a spring detent for releasably securing the said carrier in either of its positions.

12. A photographic camera in accordance with claim 3, but wherein the camera is provided with a rear, upright panel and a front upright panel, one of said panels being adjustable toward and from the other, and wherein there is provided a telescopic shaft mounted in both of said panels to permit the said adjustment of one of said panels, and wherein said telescopic shaft constitutes a part of the means for operatively connecting the iris-type diaphragm and the carrier.

13. A photographic camera in accordance with claim 3, but wherein the camera is provided with a rear panel, and wherein the said carrier is manually slidable along a face of the said rear panel in parallelism with the said panel.

14. A photographic camera in accordance with claim 3, but wherein the camera is provided with a rear upright panel and a front upright panel, the rear panel being adjustable toward and from the front panel, and wherein there is provided a telescopic shaft mounted in both of said panels to permit the adjustment of the rear panel, and wherein said telescopic shaft constitutes a part of the means for operatively connecting the iris-type diaphragm and the carrier.

15. A photographic camera in accordance with claim 4, but wherein there is provided a pump having a piston operated by the carrier movement and having a flexible tube, and wherein the shutter mechanism has a time pump connected to said flexible tube for the operation of the shutter mechanism.

16. A photographic camera in accordance with claim 4, but wherein there is provided a pump operatively connected to the carrier to be actuated thereby, the said pump having a cylinder provided with one or more vent holes and a piston connected to the carrier, and wherein the shutter is provided with a pump connected to the said cylinder so that the said piston in the cylinder may have movement in the cylinder through the action of the said carrier in bringing the ground glass toward the exposure opening, and which movement occurs before the shutter pump is operated to bring about the opening of the said shutter, and wherein as the ground glass nears a position of alignment with the exposure opening, the shutter pump will be operated to move the shutter into open position and retain the same in such position so that the camera may be focused through the use of the ground glass.

17. A photographic camera in accordance with claim 4, but wherein there is provided a pump operatively connected to the carrier to be actuated thereby, the said pump having a cylinder provided with one or more vent holes and a piston connected to the carrier, and wherein the shutter is provided with a pump connected to the said cylinder so that the said piston in the cylinder may have movement in the cylinder through the action of the said carrier in bringing the ground glass toward the exposure opening, and which movement occurs before the shutter pump is operated to bring about the opening of the said shutter, and wherein as the ground glass nears a position of alignment with the exposure opening, the shutter pump will be operated to move the shutter into open position and retain the same in such position so that the camera may be focused through the use of the ground glass, and wherein the movement of the carrier brings the ground glass into alignment with the exposure opening and also moves the iris into fully open position.

WILLIAM S. KALS.